US005491569A

United States Patent [19]

Riccobono et al.

[11] Patent Number: 5,491,569
[45] Date of Patent: Feb. 13, 1996

[54] HIGH EFFICIENCY, BROAD BANDWIDTH, VOLUME HOLOGRAPHIC ELEMENT FOR DIFFRACTION WINDOWS AND METHOD OF MANUFACTURE

[75] Inventors: Juanita R. Riccobono, Nashua; Jacques E. Ludman, Hollis, both of N.H.

[73] Assignee: Northeast Photosciences, Hollis, N.H.

[21] Appl. No.: 261,816

[22] Filed: Jun. 17, 1994

[51] Int. Cl.$^6$ .............................. G02B 5/32; G03H 1/04; G03H 1/30
[52] U.S. Cl. .................... 359/3; 359/22; 359/25; 430/1; 430/2
[58] Field of Search ................... 359/3, 15, 22, 359/25, 24; 430/1, 2

[56] References Cited

U.S. PATENT DOCUMENTS

| | | | |
|---|---|---|---|
| 3,660,091 | 5/1972 | Shankoff et al. | 359/3 |
| 3,953,105 | 4/1976 | Ih | 350/7 |
| 4,204,881 | 5/1980 | McGrew | 359/19 |
| 4,235,505 | 11/1980 | Hariharan et al. | 359/24 |
| 4,312,559 | 1/1982 | Kojima et al. | 359/19 |
| 4,367,366 | 1/1983 | Bloss et al. | 359/19 |
| 4,402,306 | 9/1983 | McElroy, Jr. | 359/19 |
| 4,418,238 | 11/1983 | Lidorenko et al. | 136/246 |
| 4,458,980 | 7/1984 | Ohki et al. | 350/3.73 |
| 4,720,158 | 1/1988 | Kuwayama et al. | 359/19 |
| 4,807,978 | 2/1989 | Grinberg et al. | 359/24 |
| 4,824,191 | 4/1989 | Kato et al. | 359/19 |
| 4,826,290 | 5/1989 | Wreede et al. | 359/3 |
| 5,039,352 | 8/1991 | Mueller et al. | 359/19 |
| 5,221,977 | 6/1993 | Leib et al. | 359/19 |
| 5,282,066 | 1/1994 | Yu et al. | 359/24 |

FOREIGN PATENT DOCUMENTS

| | | | |
|---|---|---|---|
| 63-305381 | 12/1988 | Japan | 359/24 |
| 1-222287 | 9/1989 | Japan | 359/24 |
| 1-238680 | 9/1989 | Japan | 359/24 |

OTHER PUBLICATIONS

Bradbury et al, "Holographic Lighting for Energy Efficient Greenhouses," *SPIE*, vol. 615, 1986, pp. 104–111.
Ludman, "Holographic Solar Concentrator," *Applied Optics* 1 Sep. 1982, pp. 3057 to 3058.
Ludman, "Approximate Bandwidth and Diffraction Efficiency in Thick Holograms," *American Journal of Physics*, 3 Mar. 1982, pp. 244 to 247.
Ludman et al, "Photovoltaic Systems Based on Spectrally Selective Holographic Concentrators," *SPIE*, vol. 1667, 1992, pp. 182 to 189.

*Primary Examiner*—Martin Lerner
*Attorney, Agent, or Firm*—Adam Erlich

[57] ABSTRACT

A high efficiency, broad bandwidth, volume holographic element for diffraction windows. This holographic element is fabricated so that it can passively track and diffract solar radiation throughout the course of a day. Such a hologram can effectively illuminate the interior of a building or room with sunlight. This invention can reduce both lighting costs and the cooling costs associated with generating artificial light.

6 Claims, 6 Drawing Sheets

HIGH EFFICIENCY, BROAD BANDWIDTH, VOLUME HOLOGRAPHIC ELEMENT FOR DIFFRACTION WINDOWS AND METHOD OF MANUFACTURE

BACKGROUND OF THE INVENTION

This invention relates generally to holographic elements, and more particularly to the manufacture of holographic elements that are highly efficient, have a large bandwidth, and can passively track and redirect light. These holographic elements are especially well suited to be used as diffraction windows.

Holography is a technique for recording and later reconstructing the amplitude and phase distribution of a coherent wave disturbance. Generally, the technique utilized for providing a holographic element is accomplished by recording the pattern of interference between two optical beams or waves. These waves, one for example, reflected from an object, usually called the object wave, and the other which by-passes the object, usually called the reference wave, strike a light-sensitive recording means such as a holographic film or plate. Thus incident on the recording medium is the sum of the light from the object and the mutually coherent reference wave.

While all light sensitive recording media respond only to light intensity, in the pattern of the interference between the two waves there is preserved a complete record of the amplitude and also the phase distribution of one of the waves with respect to the other. Amplitude information is preserved as a degree of modulation or in the depth of the interference fringes, while phase information is preserved as variations of the positions or pattern of the fringes.

Although a holographic element is recorded utilizing one wavelength (created by a laser), it can diffract either a narrow or broad bandwidth depending upon the fabrication parameters of the holographic element. In the case of a broad bandwidth holographic element on playback, other wavelengths will form a spectrum of wavelengths around the recorded wavelength.

Unfortunately, when utilizing conventional holographic elements for diffracting light over a broad bandwidth (where the wavelengths differ by a factor of 2) much of the original light is lost. In fact, it is typical for conventional holographic elements to have expected efficiencies of only 10% when diffracting or concentrating across a broad bandwidth. This presents particular problems when attempting to utilize holographic elements for diffracting solar light into a room to maximize natural lighting. Furthermore, previous systems to diffract natural light into a room have utilized sophisticated active tracking system. An active tracking system is very expensive and prone to mechanical or programming failure.

SUMMARY OF THE INVENTION

This invention overcomes the problems encountered in the past by providing an improved method of manufacturing a volume holographic element (a holographic element where the fringes are in the bulk of the light sensitive recording media rather than on the surface) which is highly efficient over a broad bandwidth.

The volume holographic element of this invention is produced by fabricating a holographic plate at extremely high humidity levels in excess of 90% relative humidity then slowly reducing humidity levels. Also, the holographic plate must be exposed when it is at 50–60% relative humidity and have a very thin uniform coating of holographic gelatin on the holographic plate in order to fabricate high efficiency, high bandwidth holographic elements. In addition, during exposure the relative angle of the recording beams is crucial for maximizing the bandwidth of the holographic element.

It is therefore an object of this invention to provide a high efficiency, broad bandwidth, volume holographic element for use as a diffraction window or for use with a window.

It is therefore another object of this invention to provide an improved method of manufacturing holographic elements, which are both highly efficient and can diffract a broad bandwidth of light.

It is a further object of this invention to manufacture these holographic elements with additional optical attributes which would allow them to be effective for diffracting solar light into a room to maximize natural lighting. These attributes would include the ability to passively track and diffract light.

For a better understanding of the present invention, together with other and further objects thereof, reference is made to the following description taken in conjunction with the accompanying drawings and claims.

DETAILED DESCRIPTION

DETAILED DESCRIPTION OF THE PREFERRED METHOD AND EMBODIMENTS

In order to fully understand the embodiments of this invention, it is first necessary to describe the technique of this invention for producing a holographic element including how to fabricate the holographic plate utilized to produce the holographic element.

In producing the holographic element of this invention, it is first necessary to produce a sensitized gelatin. This gelatin can be manufactured in a number of conventional ways including the preferred method described below. Deionized water is combined with chromium aluminum (1%) and Kodak Photoflo in the proportion of 49:1 of deionized water to chromium aluminum. One drop of Kodak photoflo is added for each 50 mL of deionized water-chromium aluminum solution. This solution is gradually added to and mixed with holographic grade gelatin (such as Kind & Knox holographic grade gelatin). 14 mL of the deionized water-chromium solution is added for each gram of gelatin. The deionized water-chromium solution is added to the gel in three doses and allowed to sit for 20 to 30 minutes between each dose.

To sensitize the gelatin add 0.473 grams of Ammonium Dichromate for every gram of the gelatin and then heat to 40 degrees centigrade. The mixture is filtered through course paper to produce gelatin 106.

Figure 1:
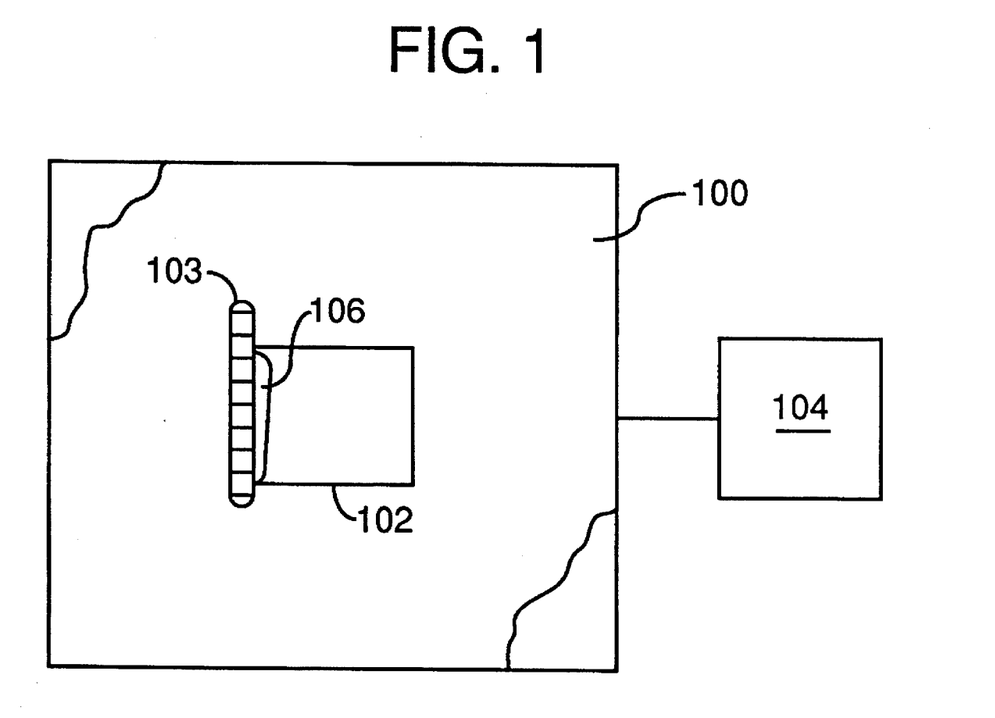
FIG. 1 is a pictorial, schematic representation of the technique of this invention for manufacturing the holographic plate of the high efficiency broad bandwidth holographic elements of the present invention.

Reference is now made to FIG. 1 to describe how a holographic plate of this invention is fabricated. The sensitized gelatin 106 is rolled onto a clean flat glass plate 102 of 20th wave quality in a clean room 100 with at greater than 90% (preferably greater than 95%) relative humidity. The humidity of clean room 100 is controlled by a conventional humidity controlling device 104. The sensitized gelatin 106 is rolled onto the glass plate 102 with, for example, a Mayer Rod 103. The gel thickness on plate 102 must be between 2 and 4 microns. Once plate 102 is coated it must remain in an environment of at least 90% (preferably at least 95%) relative humidity for at least 24 hours. Then the humidity should be slowly decreased to about 25% to 40% (preferably 30% to 35%) relative humidity over the next 24 hours, thereby producing a holographic plate 1.

Figures 2A, 2B:
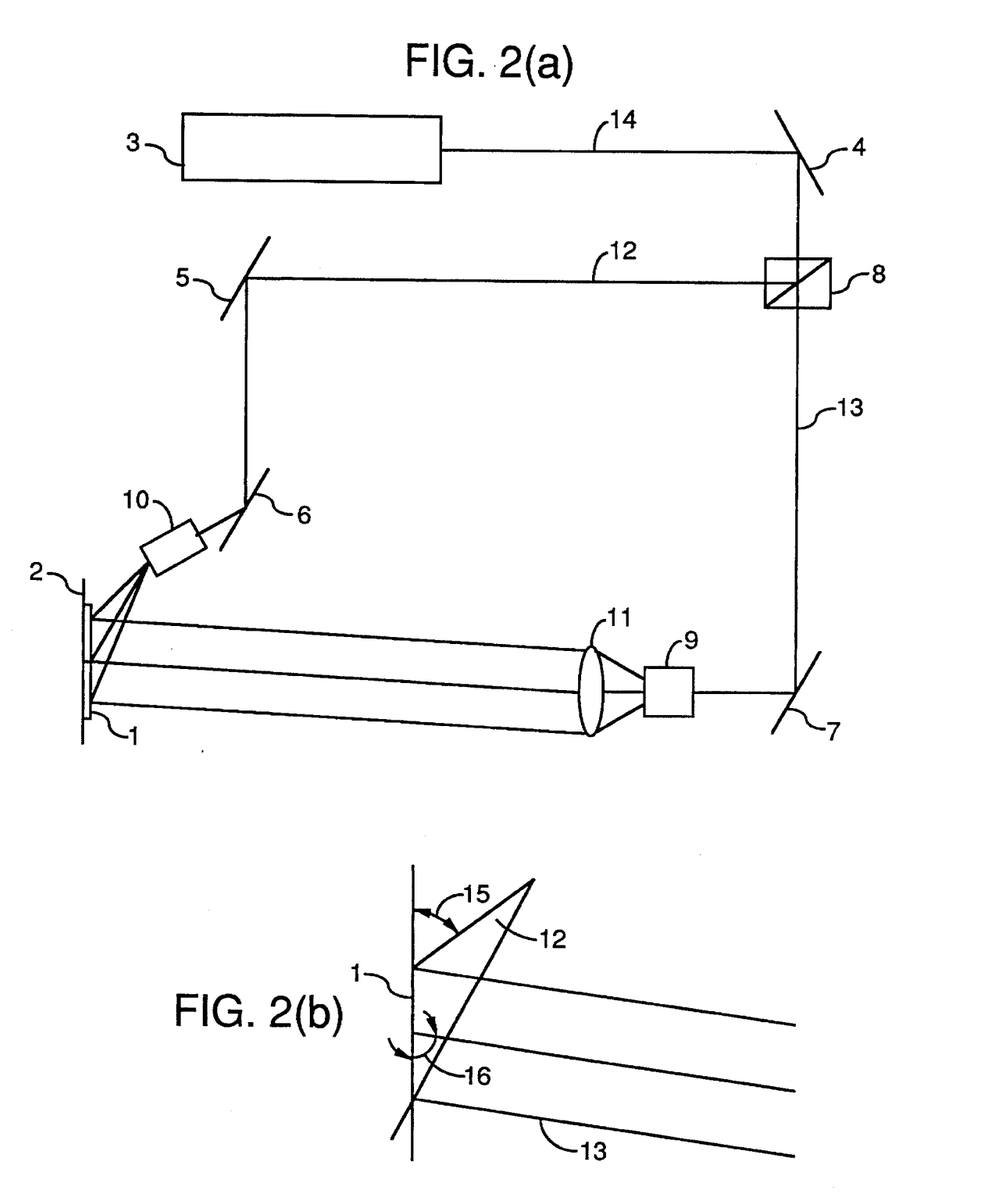
FIG. 2(a) is a schematic representation of the first technique of this invention for manufacturing the high efficiency broad bandwidth holographic elements of the present invention.
FIG. 2(b) is a close-up view of the angle between the diverging and collimated beams of light with respect to the holographic plate.

Reference is now made to FIG. 2(a) in order to fully describe one of the techniques which may be utilized to expose the holographic plate 1 and fabricate a high efficiency broad bandwidth holographic element. Still in the room 100, a laser 3, preferably argon and tuned to 488 nm, is used to generate a beam of laser light 14 that is reflected by mirror 4 to beam splitter 8. Beam splitter 8 splits the beam into beam 12 and beam 13. Mirror S reflects beam 12 to mirror 6. Mirror 6 reflects beam 12 into spatial filter 10. Spatial filter 10 causes beam 12 to diverge and directs it to holographic plate 1, which is mounted on black diffusing plate 2. Mirror 7 reflects beam 13 into spatial filter 9. Spatial filter 9 causes beam 13 to diverge. Lens 11 collimates beam 13 and directs it to holographic plate 1. Collimated beam 13 intersects holographic plate 1 at between a 70 and an 80 degree angle (preferably an 80 degree angle).

Reference is now made to FIG. 2(b). The angle 15 between diverging beam 13 and holographic plate 1 must be between 30 and 50 degrees. Angle 15 should be approximately the same as the angle that the sun (further description of the operation of the holographic element is given in reference to FIGS. 4(a–c)) will make with the holographic element during use. For example, at a latitude of 45 degrees the sun will make approximately a 45 degree angle with the holographic element. Therefore, angle 15 should be approximately 45 degrees for operation in a latitude of 45 degrees. Angle 16 is the angle between collimated beam 13 and holographic plate 1. Angle 16 should be between 70 and 80 degrees.

During the process of exposing holographic plate 1 room 100 must be at between 50–60% humidity. Laser 3 is controlled to produce beam 12 and beam 13 at 0.2 milliwatts/cm$^2$. Exposures of 100 seconds lead to exposures of 40 mj/cm$^2$. After holographic plate 1 is exposed it is detached from diffusing plate 2, fixed, cleaned with warm water, and dried using alcohol baths. The holographic plate 1 can be protected by covering it with another glass plate (not shown) using a UV curing adhesive to form the holographic element of this invention.

Figure 3A:
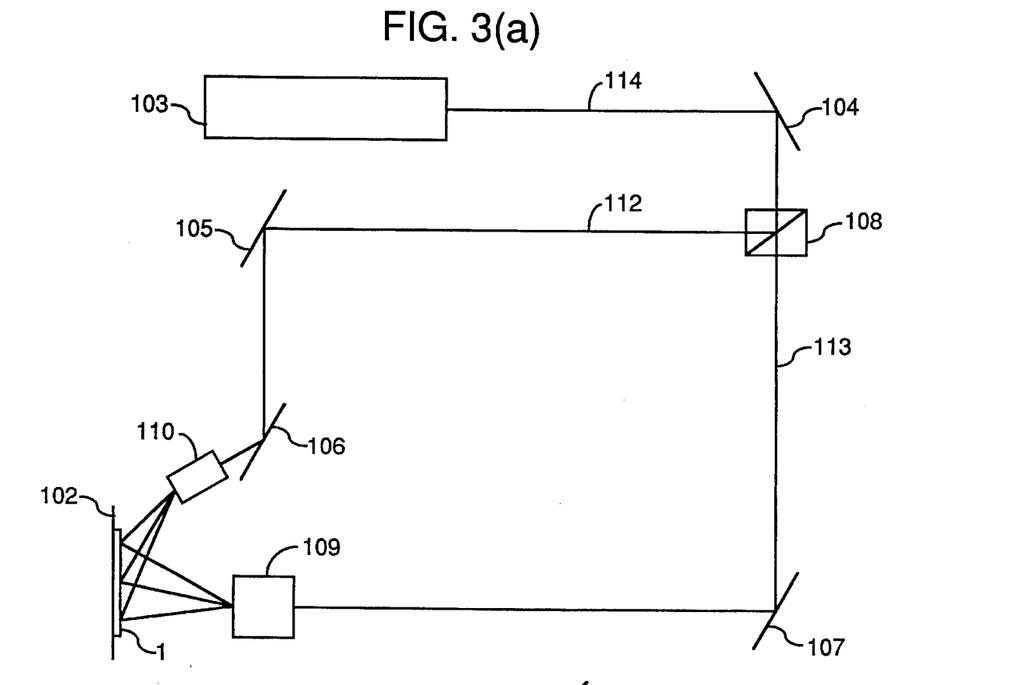
FIG. 3(a) is a schematic representation of a second technique of this invention for manufacturing the high efficiency broad bandwidth holographic elements of the present invention.

Reference is now made to FIG. 3(a) in order to-fully describe a second possible technique which may be utilized to expose the holographic plate 1 and fabricate a high efficiency broad bandwidth holographic element. Still in the room 100, a laser 103, preferably argon and tuned to 488 nm, is used to generate a beam of laser light 114 that is reflected by mirror 104 to beam splitter 108. Beam splitter 108 splits the beam into beam 112 and beam 113. Mirror 105 reflects beam 112 to mirror 106. Mirror 106 reflects beam 112 into spatial filter 110. Spatial filter 110 causes beam 112 to diverge and directs it to holographic plate 1, which is mounted on black diffusing plate 102. Mirror 107 reflects beam 113 into spatial filter 109. Spatial filter 109 causes beam 13 to diverge. Spatial filter 110 diverges beam 113 and directs it to holographic plate 1. Beam 113 intersects holographic plate 1 at between a 70 and an 80 degree angle (preferably an 80 degree angle).

Figure 3B:
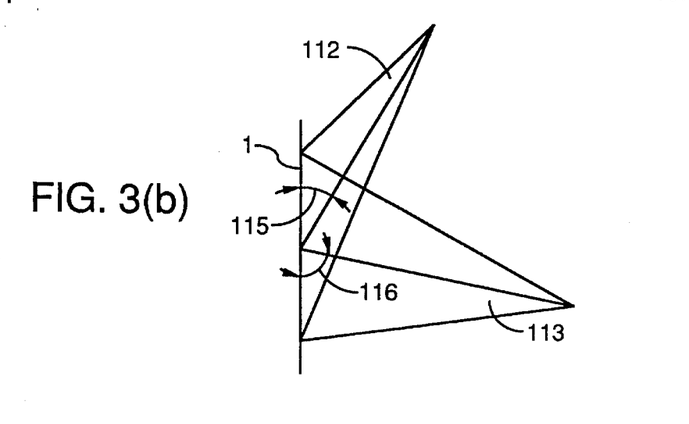
FIG. 3(b) is a close-up view of the angle between the two diverging beams of light with respect to the holographic plate.

Reference is now made to FIG. 3(b). The angle 115 between diverging beam 112 must be between 30 and 50 degrees. Angle 115 should be approximately the same as the angle that the sun (further description of the operation of the holographic element is given in reference to FIGS. 5(a–c)) will make with the holographic element during use. For example, at a latitude of 45 degrees the sun will make approximately a 45 degree angle with the holographic element. Therefore, angle 115 should be approximately 45 degrees for operation in a latitude of 45 degrees. Angle 116 is the angle between beam 113 and the holographic plate. Angle 116 should be between 70 and 80 degrees.

During the process of exposing holographic plate 1 room 100 must be at between 50–60% humidity. Laser 103 is controlled to produce beam 112 and beam 113 at 0.2 milliwatts/cm$^2$. Exposures of 100 seconds lead to exposures of 40 mj/cm$^2$. After holographic plate 1 is exposed it is detached from diffusing plate 102, fixed, cleaned with warm water, and dried using alcohol baths. The holographic plate 1 can be protected by covering it with another glass plate (not shown) using a UV curing adhesive to form the holographic element of this invention.

Figure 4A:
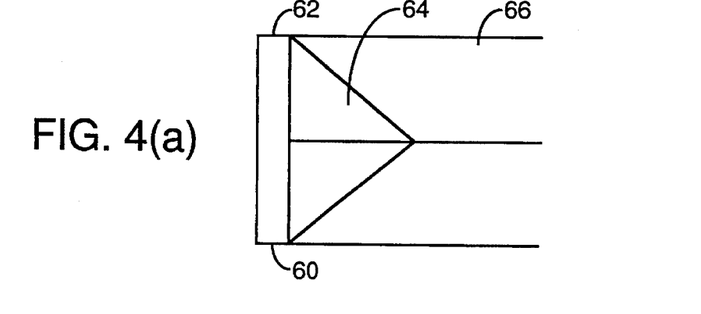
FIG. 4(a) is a top view schematic representation of the holographic element as fabricated in a first possible fabrication technique of the present invention used as a diffractive window.
Figure 4B:
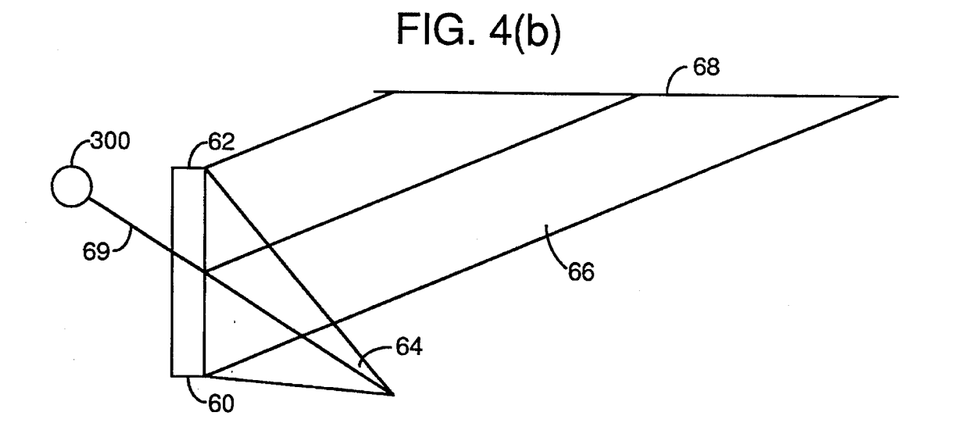
FIG. 4(b) is a side view schematic representation of the holographic element as fabricated in a first possible fabrication technique of the present invention used as a diffractive window.
Figure 4C:
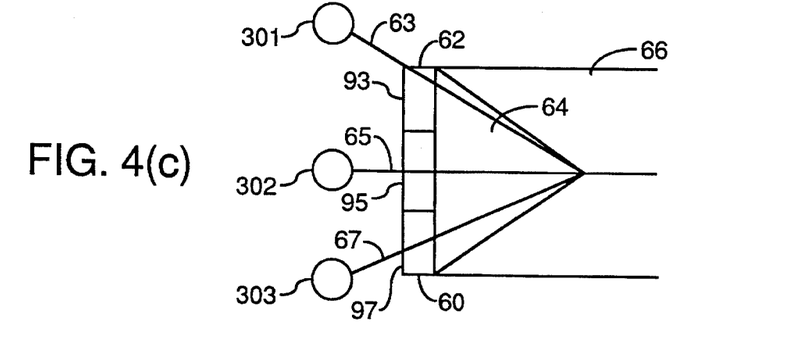
FIG. 4(c) is a top view schematic representation of the holographic element as fabricated in a first possible fabrication technique of the present invention used as a diffractive window.

FIGS. 4 (a–c) will be referred to for illustrating the operation of a diffracting window incorporating a first possible fabrication technique of the present invention therein. More specifically, window 60 may be made up only of holographic element 62 or holographic element 62 may be combined with a conventional window to form diffractive window 60. In either case, the diffracting window 60 comprises holographic element 62.

FIG. 4(a) is a top view of holographic element 62, where both converging cone 64 and collimated beam 66 in this diagram represent the operational characteristics (light that passes through holographic element 62 and would follow converging cone 64 is diffracted to follow the path of collimated beam 66) of holographic element 62. Converging cone 64 was created by diverging beam 12 during fabrication of the holographic element 62 and collimated beam 66 was created by collimated beam 13 during fabrication of the holographic element 62.

Reference is now made to FIG. 4(b). Solar radiation 69 from sun 300 that passes through holographic element 62 which would follow the path of converging cone 64, is diffracted to follow the path of collimated beam 66. The operational characteristics of holographic element 62 diffracts solar radiation 69 at ceiling 68 with a diffraction efficiency of 90% to 98%. Furthermore, solar radiation 69 is spectrally dispersed when it is diffracted by holographic element 62.

Reference is now made to top view FIG. 4(c). The operational characteristics of the holographic element of this invention is such that throughout the course of the day although the sun appears to shift in the sky (represented by suns 301, 302, and 303) a portion of solar radiation 63, 65, and 67 would follow the path of converging cone 64. Therefore, solar radiation 63, 65, and 67 are diffracted to follow the path of collimated beam 66 toward ceiling 68 (shown in FIG. 4(b)).

Solar radiation 63 and all other solar radiation (not shown) from sun 301 that would follow the path of converging cone 64 would pass through portion 93 of holographic element 62. Portion 93 is active when solar radiation 63 would follow the path of converging cone 64 and portion 93 will diffract solar radiation 63 to follow the path of collimated beam 66. As the sun appears to shift in the sky, different portions 93, 95, and 97 (in actuality holographic element 62 can be divided into an infinite number of potentially active number of portions), which correspond to the different positions of sun 301, 302, and 303 respectively become active.

Figure 5A:
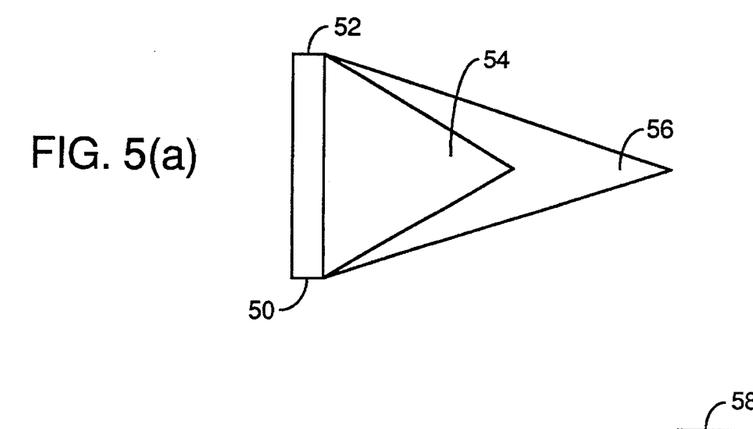
FIG. 5(a) is a top view schematic representation of the holographic element as fabricated in a second possible fabrication technique of the present invention used as a diffractive window.
Figure 5B:
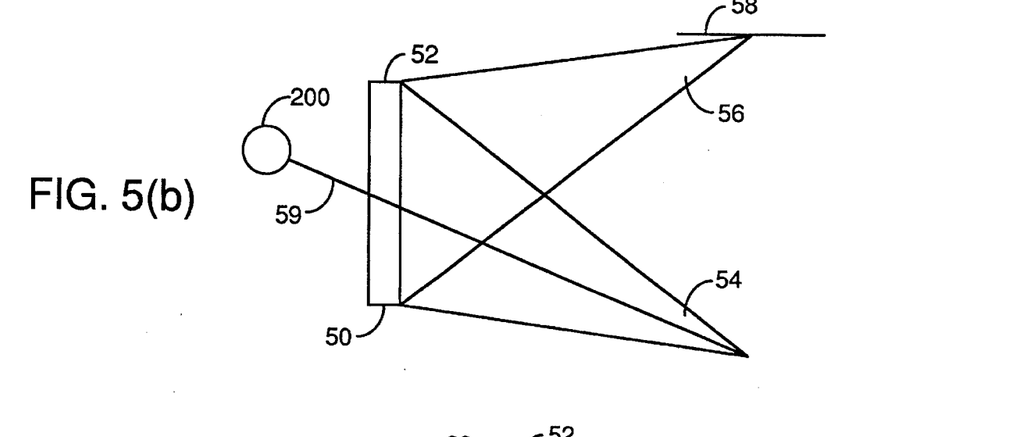
FIG. 5(b) is a side view schematic representation of the holographic element as fabricated in a second possible fabrication technique of the present invention used as a diffractive window.
Figure 5C:
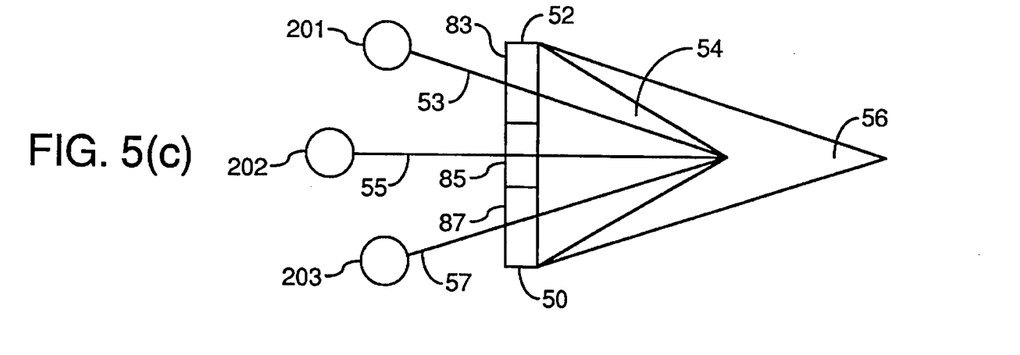
FIG. 5(c) is a top view schematic representation of the holographic element as fabricated in a second possible fabrication technique of the present invention used as a diffractive window.

FIG. 5 (a–c) will be referred to for illustrating the operation of a diffracting window incorporating a second possible fabrication technique of the present invention therein. More specifically, window 50 may be made up only of holographic element 52 or holographic element 52 may be combined with a conventional window to form diffractive window 50. In either case, the diffracting window 50 comprises holographic element 52.

FIG. 5(a) is a top view of holographic element 52, where both converging cone 54 and converging cone 56 in this diagram represent the operational characteristics of holographic element 52. Converging cone 54 was created by diverging beam 112 during fabrication of the holographic element 52 and converging cone 56 was created by diverging beam 113 during fabrication of the holographic element 52.

Reference is now made to FIG. 5(b). Solar radiation 59 from sun 300 that passes through holographic element 52 which would follow the path of converging cone 54, is diffracted to follow the path of converging cone 56. The operational characteristics of holographic element 52 diffracts solar radiation 59 at ceiling 58 with a diffraction efficiency of 90% to 98%. Furthermore, solar radiation 59 is spectrally dispersed when it is diffracted by holographic element 52.

Reference is now made to top view FIG. 5(c). The operational characteristics of the holographic element of this invention is such that throughout the course of the day although the sun appears, to shift in the sky (represented by suns 201, 202, and 203) a portion of solar radiation 53, 55, and 57 would follow the path of converging cone 54. Therefore, solar radiation 53, 55, and 57 are diffracted to follow the path of converging cone 56 toward ceiling 58.

Solar radiation 53 and all other solar radiation (not shown) from sun 201 that would follow the path of converging cone 54 would pass through portion 83 of holographic element 52. Portion 83 is active when solar radiation 53 would follow the path of converging cone 54 and portion 83 will diffract solar radiation 53 to follow the path of converging cone 56. As the sun appears to shift in the sky different portions 83, 85, and 87 (in actuality holographic element 52 can be divided into an infinite number of potentially active number of portions), which correspond to the different positions of sun 201, 202, and 203 respectively become active.

Figure 6:
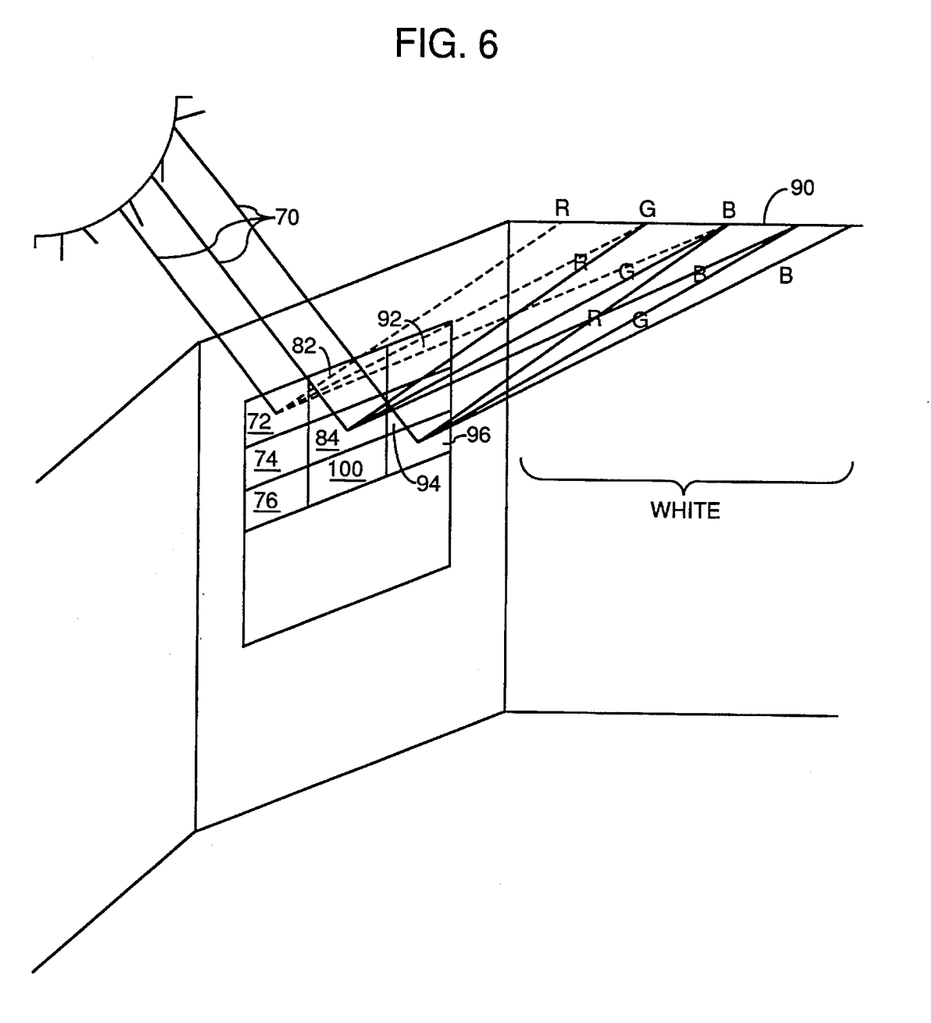
FIG. 6 is a perspective view of the holographic element used as an achromatic diffractive window.

FIG. 6 will be referred to for illustrating the operation of the diffracting achromatic holographic window of this window. Solar radiation 70 is diffracted by holographic elements 72, 74, 76, 82, 84, 86, 92, 94, and 96. Because each of the holographic elements diffract the light at a slightly different portion of ceiling 90 the colors mix and form a white light on ceiling 98. As the sun shifts in the sky a different portion of each of nine holographic elements diffract solar radiation 70 at ceiling 98 and mixes the diffracted light spectrum to create a spot of white light on the ceiling.

Although this invention has been described with reference to particular embodiments, it will be understood to those skilled in the art that this invention is also capable of a variety of further embodiments within the spirit and scope of the appended claims.

We claim:

1. A method of manufacturing a diffractive holographic element for a diffractive window comprising the steps of:

(a) providing an environment having a controllable relative humidity in which to produce said holographic element;

(b) coating a medium in said environment with a coat of sensitized gelatin to a thickness of between 2 to 4 microns to form a holographic plate;

(c) maintaining said relative humidity within said environment at greater than 90% during said coating step for a preselected period of time;

(d) decreasing said relative humidity within said environment to between 25% and 40% and maintaining said 25% to 40% relative humidity for another preselected period of time;

(e) exposing said holographic plate with a coherent beam of light that is split into both a diverging and a collimated beam where said collimated beam forms an angle between 70 and 80 degrees with said holographic plate and a diverging beam that forms an angle between 30 and 50 degree angle with said holographic plate; and (f) maintaining said environment at approximately 50% to 60% relative humidity for a preselected period of time during said exposing step in order to produce said holographic element.

2. A method of manufacturing a diffractive holographic element for a diffractive window comprising the steps of:

(a) providing an environment having a controllable relative humidity in which to produce said holographic element;

(b) coating a medium in said environment with a coat of sensitized gelatin to a thickness of between 2 to 4 microns to form a holographic plate;

(c) maintaining said relative humidity within said environment at greater than 90% during said coating step for a preselected period of time;

(d) decreasing said relative humidity within said environment to between 25% and 40% and maintaining said 25% to 40% relative humidity for another preselected period of time;

(e) exposing said holographic plate with a coherent beam of light that is split into a first and a second diverging beam where said first diverging beam forms an angle between 70 and 80 degrees with said holographic plate and a second diverging beam forms an angle between 30 and 50 degree angle with said holographic plate; and (f) maintaining said environment at approximately 50% to 60% relative humidity for a preselected period of time during said exposing step in order to produce said holographic element.

3. A holographic diffractive window for redirecting a beam of electromagnetic radiation wherein said holographic window incorporates therein a holographic element, said holographic window being produced by the following method, said method including the steps of:

(a) providing an environment having a controllable relative humidity in which to produce said holographic element;

(b) coating a medium in said environment with a coat of sensitized gelatin to a thickness of between 2 to 4 microns to form a holographic plate;

(c) maintaining said relative humidity within said environment at greater than 90% during said coating step for a preselected period of time;

(d) decreasing said relative humidity within said environment to between 25% and 40% and maintaining said 25% to 40% relative humidity for another preselected period of time;

(e) exposing said holographic plate with a coherent beam of light that is split into both a diverging and a collimated beam where said collimated beam forms an angle between 70 and 80 degrees with said holographic plate and said diverging beam forms an angle between 30 and 50 degrees with said holographic plate; and (f) maintaining said environment at approximately 50% to 60% relative humidity for a preselected period of time during said exposing step in order to produce said holographic element.

4. An achromatic holographic diffractive window comprising:

at least nine holographic elements, each of said holographic elements capable of continually diffracting solar radiation toward a specific location on a ceiling during the majority of the day; and said diffracted light mixes at said specific location to form white light.

5. A holographic diffractive window as defined in claim 4, wherein each of said holographic elements contains an active portion, wherein each of said active portions diffracts said solar radiation with a diffraction efficiency of 90% to 98% across a bandwidth extending between a longest efficiently diffracted wavelength and a shortest efficiently diffracted wavelength, where said longest efficiently diffracted wavelength is at least 1.5 times larger than said shortest efficiently diffracted wavelength.

6. An achromatic holographic diffractive window including a plurality of holographic elements, each of said holographic elements capable of continually diffracting solar radiation toward a specific location on a ceiling during the majority of the day, whereat said diffracted light mixes to form white light; wherein each of said holographic elements are produced by the following method, said method including the steps of (a) providing an environment having a controllable relative humidity in which to produce said holographic element;

(b) coating a medium in said environment with a coat of sensitized gelatin to a thickness of between 2 to 4 microns to form a holographic plate;

(c) maintaining said relative humidity within said environment at greater than 90% during said coating step for a preselected period of time;

(d) decreasing said relative humidity within said environment to between 25% and 40% and maintaining said 25% to 40% relative humidity for another preselected period of time;

(e) exposing said holographic plate with a coherent beam of light that is split into both a diverging and a collimated beam where said collimated beam forms an angle between 70 and 80 degrees with said holographic plate and said diverging beam forms an angle between 30 and 50 degrees with said holographic plate; and (f) maintaining said environment at approximately 50% to 60% relative humidity for a preselected period of time during said exposing step in order to produce said holographic element.

* * * * *